(12) United States Patent
Kluge et al.

(10) Patent No.: US 11,518,233 B2
(45) Date of Patent: Dec. 6, 2022

(54) HYBRID DRIVE TRAIN

(71) Applicant: Bayerische Motoren Werke Aktiengesellschaft, Munich (DE)

(72) Inventors: Benjamin Kluge, Munich (DE); Ulrich Ohnemus, Hattenhofen (DE); Fritz Pobitzer, Roehrmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 164 days.

(21) Appl. No.: 16/755,807

(22) PCT Filed: Nov. 19, 2018

(86) PCT No.: PCT/EP2018/081751
§ 371 (c)(1),
(2) Date: Apr. 13, 2020

(87) PCT Pub. No.: WO2019/110285
PCT Pub. Date: Jun. 13, 2019

(65) Prior Publication Data
US 2021/0362583 A1 Nov. 25, 2021

(30) Foreign Application Priority Data

Dec. 4, 2017 (DE) .................... 10 2017 221 775.8

(51) Int. Cl.
*B60K 6/48* (2007.10)
*B60K 6/24* (2007.10)
(Continued)

(52) U.S. Cl.
CPC ............... *B60K 6/48* (2013.01); *B60K 1/02* (2013.01); *B60K 6/24* (2013.01); *B60K 6/26* (2013.01);
(Continued)

(58) Field of Classification Search
CPC ... B60K 6/48; B60K 6/24; B60K 6/26; B60K 6/30; B60K 6/365; B60K 6/38;
(Continued)

(56) References Cited

U.S. PATENT DOCUMENTS 5,704,440 A * 1/1998 Urban .................... B60K 6/442
180/65.23
6,715,291 B1 * 4/2004 Liao ........................ B60L 50/16
475/5

(Continued)

FOREIGN PATENT DOCUMENTS

DE         103 09 619 A1    9/2004
DE    10 2009 059 903 A1    6/2011
(Continued)

OTHER PUBLICATIONS

International Search Report (PCT/ISA/210) issued in PCT Application No. PCT/EP2018/081751 dated Feb. 21, 2019 with English translation (four (4) pages).
(Continued)

*Primary Examiner* — John D Walters
(74) *Attorney, Agent, or Firm* — Crowell & Moring LLP

(57) ABSTRACT

A hybrid drive train for a vehicle has at least one internal combustion engine with an internal combustion engine drive shaft, in particular a crankshaft, and at least one first electrical machine with a first electrical machine drive shaft. The internal combustion engine and the first electrical machine are designed to transfer a torque to at least one drive axle. A transmission has a transmission input shaft and a transmission output shaft which is operatively connected to a first drive axle that can be driven by the internal combustion engine. The transmission input shaft of the transmission is connected at least to the internal combustion engine drive shaft of the internal combustion engine in order to transfer a torque from the internal combustion engine to (Continued)

the transmission input shaft and further to the first drive axle. The transmission input shaft and the internal combustion engine drive shaft of the internal combustion engine are arranged parallel to each other.

19 Claims, 3 Drawing Sheets

(51) Int. Cl.
    *B60K 6/26*         (2007.10)
    *B60K 1/02*         (2006.01)
    *B60K 17/22*       (2006.01)
    *B60K 6/30*         (2007.10)
    *B60K 6/365*       (2007.10)
    *B60K 6/38*         (2007.10)
    *B60K 6/405*       (2007.10)
    *B60K 6/543*       (2007.10)

(52) U.S. Cl.
    CPC ................. *B60K 6/30* (2013.01); *B60K 6/365* (2013.01); *B60K 6/38* (2013.01); *B60K 6/405* (2013.01); *B60K 6/543* (2013.01); *B60K 17/22* (2013.01); *B60Y 2200/92* (2013.01)

(58) Field of Classification Search
    CPC .......... B60K 6/405; B60K 6/543; B60K 1/04; B60K 17/22; B60K 1/02; B60Y 2200/92
    See application file for complete search history.

(56) References Cited

U.S. PATENT DOCUMENTS

| | | | |
|---|---|---|---|
| 9,139,079 B2* | 9/2015 | Suntharalingam | B60K 6/365 |
| 9,248,732 B2* | 2/2016 | Honda | F16H 48/36 |
| 9,950,607 B2* | 4/2018 | Littlefield | B60K 6/365 |
| 10,328,787 B2* | 6/2019 | Scholle | B60K 6/48 |
| 10,641,380 B2* | 5/2020 | Hara | F16D 25/0635 |
| 2013/0252774 A1 | 9/2013 | Suntharalingam et al. | |
| 2014/0256490 A1 | 9/2014 | Honda | |
| 2017/0136870 A1* | 5/2017 | Littlefield | B60K 6/365 |

FOREIGN PATENT DOCUMENTS

| | | |
|---|---|---|
| DE | 10 2014 018 463 A1 | 6/2016 |
| EP | 2 218 603 A1 | 8/2010 |
| EP | 3 150 479 A1 | 4/2017 |
| EP | 3 261 233 A1 | 12/2017 |

OTHER PUBLICATIONS

German-language Written Opinion (PCT/ISA/237) issued in PCT Application No. PCT/EP2018/081751 dated Feb. 21, 2019 (seven (7) pages).

German-language Search Report issued in German Application No. 10 2017 221 775.8 dated Sep. 3, 2018 with partial English translation (12 pages).

* cited by examiner

Direction of Travel

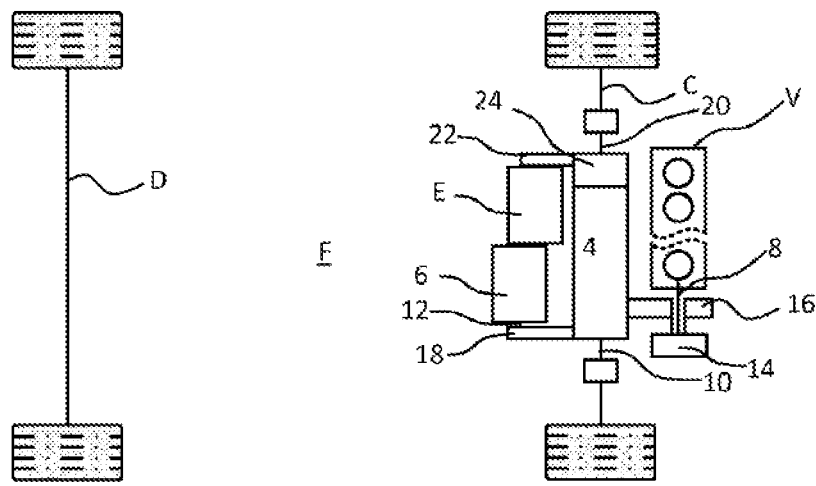
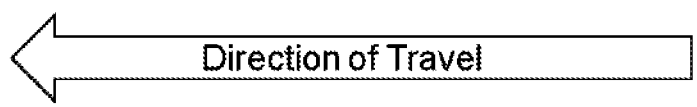
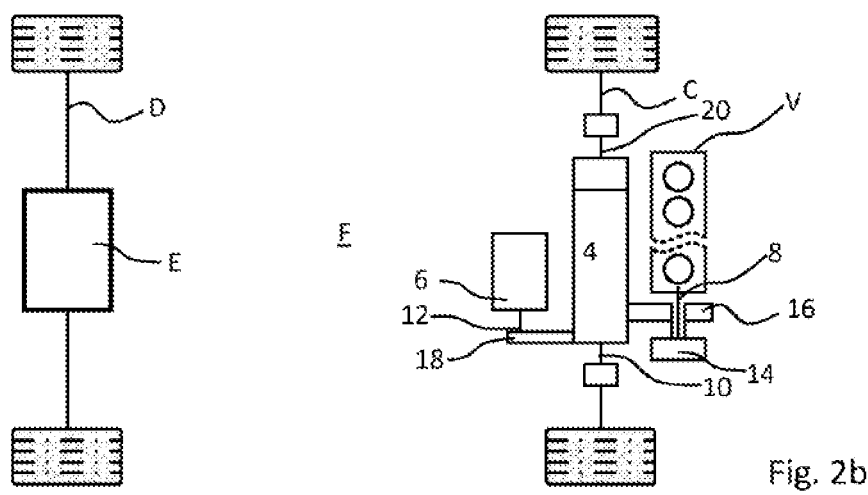

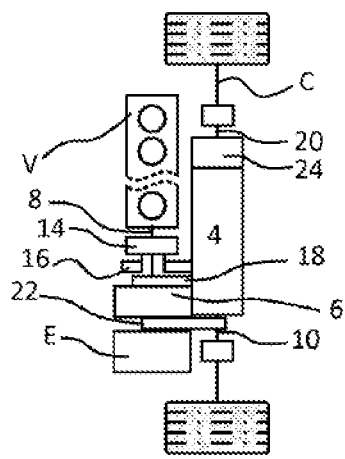
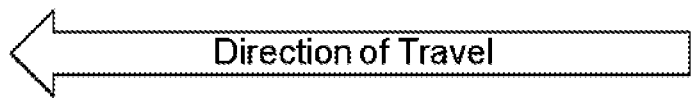
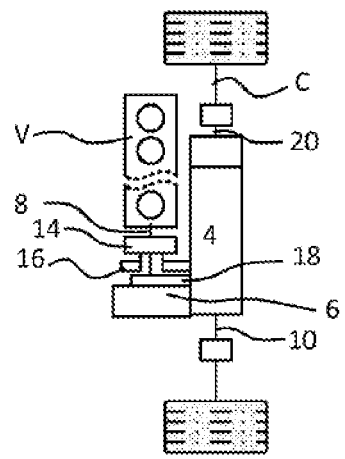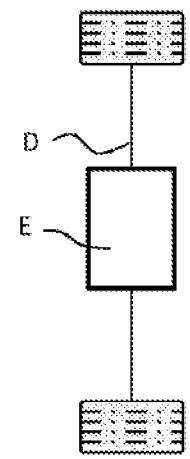

HYBRID DRIVE TRAIN

BACKGROUND AND SUMMARY OF THE INVENTION

The present invention relates to a hybrid drive train for a vehicle, having at least one internal combustion engine, an electrical machine and a transmission.

In the known hybrid drive transmissions, the drive shaft of the internal combustion engine, in particular the crankshaft, is conventionally connected directly or indirectly to the transmission input shaft, generally via a clutch device, wherein the transmission and internal combustion engine are arranged axially next to each other with regard to the power flux from the internal combustion engine to the transmission. The at least one electrical machine can likewise be arranged axially next to the internal combustion engine or the transmission, but it is also known to arrange the electrical machine and the drive shaft thereof axially parallel to the transmission or to the internal combustion engine. By means of said axially parallel arrangement, construction space in the longitudinal direction, i.e. in the direction in which internal combustion engine and transmission are arranged, can be saved. However, it is disadvantageous here that, in a configuration of this type, the performance of the electrical machine remains limited because of the small construction space available for it.

The two drive units, both the internal combustion engine and the electrical machine, transmit their torque to a transmission input shaft of the transmission, and the transmission converts the torque and rotational speed and merges or divides the power from the internal combustion engine and electrical machine. The power is finally output to the drive axle at the transmission end conventionally by a differential.

However, a problem of the known drive train architectures is that the known architecture requires a large amount of space and the internal combustion engine and transmission arranged next thereto frequently have to be aligned along a longitudinal axis of the vehicle in order to provide the appropriate construction space. In the case of front transverse installations, that is to say the arrangement of the internal combustion engine and transmission along a transverse axis of the vehicle, a compromise necessitated by the construction space therefore frequently has to be made.

However, installation along the longitudinal axis of the vehicle means that the internal combustion engine and transmission project into a construction space for a flat storage unit between the vehicle axles, which involves corresponding disadvantages with regard to electrical range and structural rigidity of the flat storage unit.

It is therefore the object of the present invention to provide a hybrid drive train architecture which requires little overall construction space, but provides as large a construction space as possible for the electrical machine and the internal combustion engine and provides an optimum arrangement and configuration for the flat storage unit.

This object is achieved by a hybrid drive train according to the claimed invention.

A hybrid drive train for a vehicle is presented below, having at least one internal combustion engine with an internal combustion engine drive shaft, in particular a crankshaft, and at least one first electrical machine with a first electrical machine drive shaft, wherein the internal combustion engine and the first electrical machine are designed to transmit a torque to at least one drive axle of the vehicle. Furthermore, the hybrid drive train has a transmission with a transmission input shaft and a transmission output shaft which is operatively connected to the drive axle. The transmission input shaft of the transmission is connected here to the internal combustion engine drive shaft of the internal combustion engine in order to transmit a torque from the internal combustion engine to the transmission input shaft, from there to the drive axle and subsequently to the wheels.

In order to achieve a particularly compact design and to permit a front or rear transverse installation, it is provided according to the invention that the transmission input shaft and the internal combustion engine drive shaft of the internal combustion engine are arranged parallel to each other. This means that an arrangement of the transmission and internal combustion engine axially next to each other is dispensed with, and therefore there is a significant reduction in the construction space required in the longitudinal direction of the drive shaft or of the transmission input shaft. As a result, even in the event of narrow available vehicle widths, which are limited, for example, by longitudinal members in the front region of the vehicle, the hybrid drive train can be installed transversely with respect to the longitudinal axis of the vehicle (front transverse installation). If said drive unit is installed on the rear axle, importance is also to be attached to a correspondingly short arrangement (rear transverse installation). This in turn permits a maximization of the construction space for high-voltage storage units (flat storage units) which are conventionally installed in the floor region between the axles. This in turn increases the electrical range, and therefore the described hybrid drive focuses more strongly on the electrical drive.

The first electrical machine provided for the electrical driving mode of the hybrid drive train can be operatively connected directly to the same drive axle which is drivable by the internal combustion engine, in particular via coupling by means of a transverse driving device, in particular a toothed chain, a belt or a gearwheel connection, in particular a gearwheel cascade, to a differential. It is in particular advantageous here if the differential into the transmission is arranged at the transmission output axially in the longitudinal direction of the transmission input shaft, and/or is designed as a planetary spur gear differential or as a spur gear differential which requires significantly less axial construction space than a conventional bevel gear differential.

Alternatively, the first electrical machine can be arranged on a second vehicle axle and can drive the second vehicle axle, and can be operatively connected only via a road coupling to the drive axle driven by the internal combustion engine. Both configurations permit installation of a powerful electrical machine which provides sufficient power for a long, purely electrical driving mode.

According to a further advantageous exemplary embodiment, a second electrical machine is provided which has a second electrical machine drive shaft, wherein the second electrical machine drive shaft of the second electrical machine is connected to the transmission input shaft, and wherein the second electrical machine is designed to provide an eCVT operation having one or more operating modes between the second electrical machine and the internal combustion engine. A configuration of this type makes it possible to dispense with friction shift elements in the transmission gear set or at the transmission input, such as also any form of torque and speed converter, for example a dual clutch. The latter would have the tasks, upon coupling the internal combustion engine and transmission, of equalizing the rotational speeds of the internal combustion engine drive shaft and transmission input shaft and of coupling the internal combustion engine to the transmission input shaft without a jolt.

In order, however, when friction shift elements are dispensed with in the transmission, not to have to dispense with the possibility of interrupting the transmission of torque in the drive train, it is provided, in a further advantageous exemplary embodiment, furthermore to provide at least one, preferably passive, decoupling device, in particular a slip clutch, which is designed to interrupt a transmission of torque between the internal combustion engine and/or the first and/or the second electrical machine and the drive axle when a predetermined torque threshold value is exceeded. It is in particular preferred here to arrange the decoupling device in the transmission and/or in an irregular rotation compensating device.

Furthermore, the dispensing with friction shift elements in the drive train then also makes it possible to dispense with a complex hydraulic activation of transmission or clutch devices, which significantly simplifies the design and makes it more cost-effective. Furthermore, a configuration of this type has the advantage that, in particular with the use of an electrical machine as a synchronization element between the internal combustion engine drive shaft and transmission input shaft or shift elements forming a power path, an independent supply of the transmission with transmission oil is no longer obligatory, and instead use may also be made of engine oil. This in turn permits the internal combustion engine and transmission to be integrated in a common housing. In addition, the mechanical efficiency of the transmission can be significantly increased by the use of form-fitting shift elements.

Furthermore, it is advantageous if the transmission is designed as a planetary coupling transmission. A planetary coupling transmission of this type takes up little axial construction space and is therefore preferred for a drive train architecture of this type. In this case, in particular, the transmission input shaft can be designed as a hollow shaft through which the drive axle is guided. The axial short design of the transmission provided by the configuration as a planetary coupling transmission makes it possible to ensure that, even with a drive axle guided through the transmission, the transmission can be fitted in a transverse installation manner into the construction space between the joint points of the drive shaft.

If, in addition, the stationary transmission ratios are kept small, the radial dimensioning of the gear set can also be effectively reduced.

The parallel arrangement of the internal combustion engine and transmission furthermore permits an advantageous refinement in which the internal combustion engine and the transmission are accommodated in a common housing. This also makes it possible, for example, for the transmission to also be lubricated with the engine oil, and therefore additional oil supply lines and lubricant pumps can be dispensed with. In particular the abovementioned refinement of the hybrid drive train can be used here with an additional, second electrical machine as a synchronization element, but other refinements are also possible. For example, use can be made of a shifting actuating mechanism acting in a needs-oriented manner, for example an electromechanical drum actuating mechanism known from a dual clutch transmission, which would be sufficient for carrying out the shifting functions in the transmission. It is thus also possible to omit dirt-sensitive hydraulic valves in this refinement, and the demands imposed on the transmission oil are reduced overall to an extent such that it is permissible to use engine oil as the transmission lubricant.

Furthermore, it is advantageous if the first and/or the second electrical machine drive axle are/is arranged parallel to the internal combustion engine drive shaft of the internal combustion engine and the transmission input shaft. As a result, construction space can be saved in the transverse direction of the vehicle and a particularly compact hybrid drive train can be provided.

According to a further advantageous exemplary embodiment, the transmission input axle and the parallel-aligned internal combustion engine drive shaft of the internal combustion engine and/or the second electrical machine drive shaft of the second electrical machine are connected to one another via a transverse driving device, in particular via a toothed chain, a belt, or a gearwheel connection, in particular a gearwheel cascade. This transverse driving device permits torque to be transmitted in a simple manner from the parallel drive shafts to the transmission input shaft or drive axle. The construction space available for the first or second electrical machine can thereby be maximized.

Since a certain irregular rotation frequently arises from an internal combustion engine because of the conversion from the linear piston movement into a rotational movement of the drive shaft, it is provided, according to a further advantageous exemplary embodiment, to arrange an irregular rotation compensating device between the transmission input shaft and the first drive shaft of the internal combustion engine. Said irregular rotation compensating device can be configured, for example, as a dual mass flywheel. For example, the drive shaft of the internal combustion engine can be guided here in a hollow shaft of the irregular rotation compensating device in order to achieve an arrangement saving construction space. The irregular rotation compensating device compensates for the irregular rotation of the rotational movement of the internal combustion engine, and therefore a uniform rotational movement can be transmitted to the transmission input shaft via the transverse drive. If there were a direct connection between the drive shaft of the internal combustion engine and the transmission input shaft, the irregular rotation of the internal combustion engine would greatly load the transverse drive and transmission excessively mechanically and limit the service lives thereof.

According to a further advantageous exemplary embodiment, the transmission furthermore has a transmission output shaft via which a torque from the transmission is transmitted to a drive axle driving a first and a second vehicle wheel. The transmission output shaft is connected here to the drive axle, and the drive axle is aligned axially with respect to the transmission input shaft and parallel to at least one of the drive shafts in the direction of the longitudinal axis of the transmission. This alignment and arrangement makes it possible to ensure that a torque is transmitted directly from the transmission to the drive axle, and therefore construction space is also saved here. The transmission output shaft here can be directly the drive axle which is guided through the transmission, for example in a transmission shaft which is designed as a hollow shaft and can be, but does not necessarily have to be, the transmission input shaft, in order to correspondingly drive the right and the left vehicle wheel. This refinement also saves on construction space since the transmission is operatively connected directly to the drive axle and accordingly can be arranged directly on the drive axle.

According to a further advantageous exemplary embodiment, the internal combustion engine and the at least one electrical machine are arranged on both sides of the transmission axially in the direction of travel. This means that, for example, the internal combustion engine is arranged behind the transmission in the direction of travel while the at least one electrical machine is arranged in front of the transmission in the direction of travel. Alternatively, it is, of course, also possible for the internal combustion engine to be arranged in front of the transmission in the direction of travel and for at least one electrical machine to be arranged behind the transmission in the direction of travel. This refinement permits a particularly compact design, and therefore the hybrid drive train can also be installed between existing longitudinal members of the vehicle in the front transverse installation direction.

As an alternative to the arrangement described above, it is also possible to arrange the internal combustion engine and the at least one electrical machine next to each other. This likewise permits a very small expansion of the drive train in the longitudinal direction of the vehicle, and therefore the space required in the longitudinal direction of the vehicle is reduced further. In a refinement of this type, it is also advantageous if the internal combustion engine is kept relatively small and, for example, serves merely as a range extender.

According to a further advantageous exemplary embodiment, as mentioned above, a first and a second electrical machine are provided, wherein the first electrical machine is arranged on the axle driven by the internal combustion engine and the second electrical machine is arranged on a further vehicle axle not drivable by the internal combustion engine, and is designed to drive said further vehicle axle. This makes it possible to provide a drive train architecture in which the two vehicle axles, rather than only one axle, are actively driven (all-wheel drive).

As an alternative to the refinement in which a first and a second electrical machine are arranged on different axles, it is also possible, as likewise mentioned above, to arrange two electrical machines on the axle driven by the internal combustion engine. If, in this case, the two electrical machines are also arranged spatially close to each other, a double inverter can also be used, and therefore each electrical machine does not have to be equipped with its own inverter. Also as a result, the construction space can be used in an optimized manner and a large amount of space for the high-voltage storage unit can be provided.

The axle driven by the internal combustion engine can be both the front axle and the rear axle.

Further possible implementations of the invention also comprise combinations of features or embodiments described above or below with respect to the exemplary embodiments, that are not explicitly cited. In this case, a person skilled in the art will also add individual aspects as improvements or additions to the respective basic form of the invention.

Further advantages and advantageous embodiments are specified in the description, the drawings and the claims. The combinations of features specified in the description and in the drawings are in particular purely by way of example, and therefore the features may also be present individually or combined in some other way.

The invention will be described in more detail below with reference to exemplary embodiments illustrated in the drawings. The exemplary embodiments and the combinations shown in the exemplary embodiments are purely by way of example and are not intended to define the scope of protection of the invention. This is defined solely by the dependent claims.

BRIEF DESCRIPTION OF THE DRAWINGS

FIG. 1b is a schematic view of a variation of the exemplary embodiment shown in FIG. 1a.

FIG. 2a is a schematic view of a second preferred exemplary embodiment of a hybrid drive train.

FIG. 2b is a schematic view of a variation of the exemplary embodiment shown in FIG. 2a.

FIG. 3a is a schematic view of a third preferred exemplary embodiment of a hybrid drive train.

FIG. 3b is a schematic view of a variation of the exemplary embodiment shown in FIG. 3a.

In the following, elements which are identical or act identically in terms of function are identified by the same reference signs.

DETAILED DESCRIPTION OF THE DRAWINGS

Figure 1A:
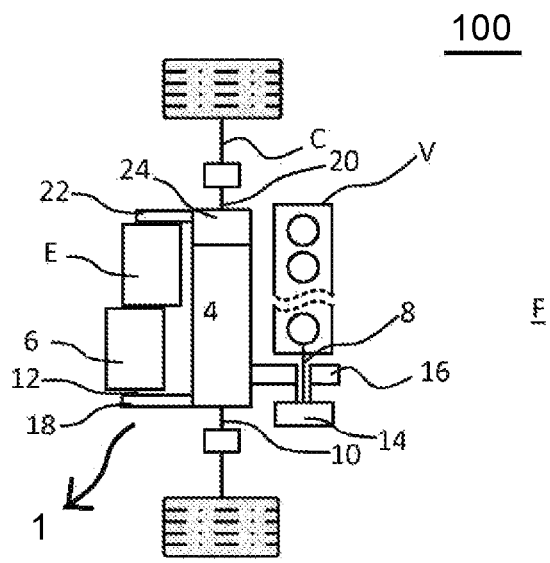
FIG. 1a is a schematic view of a first preferred exemplary embodiment of a hybrid drive train.
Figure 1B:
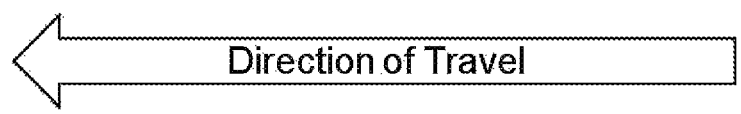
Figure 1B:
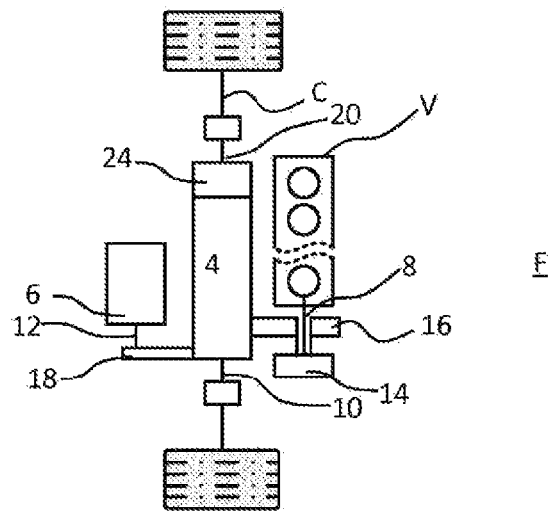

FIGS. 1 to 3 each show, in the subfigures a and b, a schematic illustration of two variants of a vehicle 100 with a hybrid drive train 1, wherein the hybrid drive train 1 has two drive units, namely an internal combustion engine V, and an electrical machine E. The two drive units V and E provide a torque with which a drive axle C and/or D, and therefore at least one vehicle wheel, can be driven. The variants of subfigures a and b differ in each case in that, in variant a, the internal combustion engine V and the electrical machine E drive the same drive axle C while, in variant b, the internal combustion engine V and the electrical machine E drive different axles C and D. Furthermore, it can be gathered from the figures that the hybrid drive train comprises a transmission 4 with a transmission input shaft 10 in order to transmit a torque from the internal combustion engine V via its internal combustion engine drive shaft 8 on the transmission input side to the transmission input shaft 10 and on the transmission output side to the drive axle C.

As can furthermore be gathered from FIGS. 1 to 3, the internal combustion engine drive shaft 8 is arranged parallel to the transmission input shaft 10, and therefore the transmission 4 can be installed in the vehicle 100 transversely with respect to a direction of travel (see arrow). As a result, it is no longer necessary to accept a restriction, induced by the construction space, for the transmission 4 and/or the internal combustion engine V in order to be able to realize the transverse installation even in the existing frame structures, in particular between the existing longitudinal members of the vehicle body. The parallel arrangement of the transmission 4 and the internal combustion engine V makes it possible to provide a very compact hybrid drive train 1 which, because of the transverse alignment of its shafts with respect to the direction of travel, needs hardly any construction space in the longitudinal direction. As a result, the region F available between the axles C, D may be virtually completely available for accommodating high-voltage storage units. As a result, more and structurally more stable flat storage units can be used, which in turn makes it possible for more powerful electrical machines to be able to be used in the hybrid drive train, as a result of which in turn, inter alia, the range of the electrical driving power can be positively influenced.

Furthermore, it can be gathered from the figures that a second electrical machine 6 is provided, wherein the second electrical machine 6 ensures that at least one eCVT mode can be realized in the transmission. The transmission 4 is preferably configured here as a planetary coupling transmission.

In addition, the use of an electrical machine 6 which, together with the internal combustion engine V, can provide at least one eCVT mode, and the configuration of the transmission 4 as a planetary coupling transmission make it possible to dispense with friction shifting elements, such as, for example, friction disk brakes or friction disk clutches in the drive train, and to dispense with the conventional complex hydraulic activation of transmission 4 and clutch device, and therefore the requirements which are imposed on a transmission oil are significantly reduced. This in turn makes it possible to simplify the supply and provision of oil and may, in the particularly preferred case, even permit the transmission 4 and internal combustion engine V to be integrated in a common housing. In order, when friction shifting elements are dispensed with, nevertheless to permit the transmission of torque from the internal combustion engine V to the drive axle C to be interrupted, furthermore a, preferably passive, decoupling device (not illustrated), such as, for example, a slip clutch, can be provided in the drive train 1. Said decoupling device can be arranged, for example, in the transmission 4 itself and ensures that, when a predetermined torque is exceeded, the rotationally fixed transmission of torque is interrupted, and therefore the shafts and engagement elements are not damaged.

As can furthermore be gathered from FIGS. 1 to 3, the crankshaft 8, i.e. the internal combustion engine drive shaft 8 of the internal combustion engine V, is arranged parallel to the transmission input shaft 10 of the transmission 4 and also parallel to the electrical machine drive shaft 12 of the electrical machine 6. In addition, the internal combustion engine V is connected via its internal combustion engine drive shaft 8 to an irregular rotation compensating device 14 which, in turn, is connected to a transverse drive 16, and therefore a torque which is transmitted from the internal combustion engine V to the drive shaft 8 and then to the irregular rotation compensating device 14 is transmitted via the transverse drive 16 to the transmission input shaft 10 of the transmission 4. The irregular rotation compensating device 14 compensates for irregular rotations which arise due to the piston movement of the internal combustion engine V, and therefore the transverse drive 16 is not excessively loaded mechanically. The transverse drive 16 can in this case be a toothed chain, a belt or else a gearwheel cascade. The abovementioned decoupling device can also be integrated in the irregular rotation compensating device 14 instead of in the transmission 6.

Analogously to the transverse drive 16, the driven shaft 12 of the electrical machine 6 is also connected via a transverse drive 18 to the transmission input shaft 10. Said transverse drive 18 can also be formed via a toothed chain or gearwheel cascade and ensures that the rotational speed of the transmission input shaft 10 and the rotational speed of the internal combustion engine drive shaft 8 can be synchronized. However, any desired transverse drives can be used both for the transverse drive 16 and for the transverse drive 18.

As FIGS. 1 to 3 furthermore show, the transmission input shaft 10 is coaxial with respect to the drive axle C of the vehicle, and therefore maximum use of the construction space can be made. In particular, the transmission output shaft 20 can in this case be connected directly to the drive axle C or can be configured as the latter. In order to permit passage through the transmission 4, it can furthermore be provided that the transmission input shaft 10 is designed as a hollow shaft through which the drive axle C is guided.

The figures furthermore show that the electrical machine E responsible for the electric drive can in principle be arranged at two possible points which are shown in variants a and b of the figures. Firstly, the electrical machine E, as shown in variant b, can be connected directly to a further axle D, which is not driven by the hybrid drive train 1, and therefore not only an individual vehicle axle C, but also the other vehicle axle D can be driven. Alternatively, the electrical machine E is arranged transversely next to the electrical machine 6 and is also connected here directly via a transverse drive 22 to the transmission 4 (see variant a). It is in particular preferred here if the electrical machine E interacts on the transmission output side with a (planetary) spur gear differential 24 which is arranged axially at the output of the gear set next to the transmission and is preferably integrated in the transmission. A further planetary transmission stage as a final conversion stage can be added to said differential 24.

As in particular the configuration of FIG. 1 shows, the internal combustion engine V and the electrical machine 6; E are arranged on both sides of the transmission 4. Thus, for example as illustrated, the internal combustion engine V is arranged behind the transmission 4 in the direction of travel while the electrical machine 6 is arranged in front of the transmission 4. Of course, a different arrangement is also possible in which, for example, the internal combustion engine V is arranged in front of and the electrical machine 6 behind, the transmission 4.

Furthermore, the axle C which is driven by the hybrid drive train 1, as in the example illustrated in FIG. 1, can be the front axle, but it is also possible, as FIG. 2 shows, for the rear axle to be driven by the hybrid drive train 1. Analogously to the case illustrated in FIG. 1b, in variant b (see FIG. 2b), the front axle D is then driven by the second electrical machine E.

Alternatively to the configurations illustrated in FIGS. 1 and 2, FIG. 3 shows a further possible arrangement of the internal combustion engine V, first electrical machine E, transmission 4 and second electrical machine 6, in which the internal combustion engine V and the electrical machine(s) 6 (optionally 6 and E) are arranged on the same side of the transmission 4. A configuration of this type makes it possible to further restrict in particular the longitudinal construction space required by the hybrid drive 1. Also in the exemplary embodiment illustrated in FIG. 3, the driven shafts 8, 12 of the internal combustion engine V and electrical machine 6 are arranged parallel to the transmission input shaft 10 and are connected thereto via transverse drives 16, 18. Also in this variant, there is the possibility of integrating the electrical machine E on the axle C (FIG. 3a) or alternatively of directly driving another axle D (FIG. 3b). Furthermore, the variant of FIG. 3a shows that the electrical machine E which ensures electric driving does not necessarily have to be connected to the differential 24, as in FIGS. 1 and 2, but rather can also interact directly with the transmission input shaft 10 via the transverse drive 22.

Overall, with the hybrid drive train arrangement described, a particularly compact arrangement of the hybrid drive elements can be provided, and therefore the construction space F for accommodating the high-voltage energy storage unit between the vehicle axles C, D is maximized. As a result, the range for the electrical driving mode can be significantly increased, and therefore the electrical portion of the hybrid drive is increased and the internal combustion engine V has to be switched on only in the event of an emergency.

REFERENCE SIGNS

1 Hybrid drive train
4 Transmission
6 Electrical machine
8 Internal combustion engine drive shaft 10 Transmission input shaft
12 Electrical machine drive shaft
14 Irregular rotation compensating device
16, 18 Transverse drive
20 Transmission output shaft
22 Transverse drive
24 Differential
V Internal combustion engine
E Second electrical machine (for drive)
C, D Drive axle
F Construction space for high-voltage storage unit

What is claimed is:

1. A hybrid drive train for a vehicle, comprising:
an internal combustion engine with an internal combustion engine drive shaft;
a first electrical machine with a first electrical machine drive shaft, wherein the internal combustion engine and the first electrical machine are designed to transmit a torque to at least one drive axle;
a second electrical machine which has a second electrical machine drive shaft; and
a transmission with a transmission input shaft and a transmission output shaft which is operatively connected to a first drive axle of the at least one drive axle drivable by the internal combustion engine, wherein
the transmission input shaft of the transmission is connected at least to the internal combustion engine drive shaft of the internal combustion engine in order to transmit a torque from the internal combustion engine to the transmission input shaft and on to the first drive axle,
the transmission input shaft and the internal combustion engine drive shaft of the internal combustion engine are arranged parallel to each other,
the second electrical machine drive shaft of the second electrical machine is connected to the transmission input shaft, and
the second electrical machine is designed to realize at least one eCVT mode in the transmission.

2. The hybrid drive train for a vehicle according to claim 1, wherein
the engine drive shaft is a crankshaft.

3. The hybrid drive train according to claim 1, wherein at least one of:
the first electrical machine is operatively connected to the first drive axle, or
the first electrical machine is operatively connected to a second vehicle axle which is not drivable by the internal combustion engine.

4. The hybrid drive train according to claim 1, wherein the eCVT mode is realized in the transmission via a corresponding gear set installed in the transmission.

5. The hybrid drive train according to claim 1, wherein the transmission is a planetary coupling transmission.

6. The hybrid drive train according to claim 1, wherein the internal combustion engine and the transmission are accommodated in a common housing.

7. The hybrid drive train according to claim 1, wherein
at least one of the first electrical machine drive shaft or the second electrical machine drive shaft are arranged parallel to the internal combustion engine drive shaft of the internal combustion engine and the transmission input shaft.

8. The hybrid drive train according to claim 1, wherein
the transmission input shaft and at least one of the parallel aligned internal combustion engine drive shaft of the internal combustion engine or the second electrical machine drive shaft of the second electrical machine are connected to one another via a transverse driving device.

9. The hybrid drive train according to claim 8, wherein the transverse driving device is a toothed chain, a belt, or a gearwheel connection.

10. The hybrid drive train according to claim 8, further comprising:
an irregular rotation compensating device arranged between the transmission input shaft and the internal combustion engine drive shaft of the internal combustion engine, wherein
a torque is transmitted from the internal combustion engine into the irregular rotation compensating device, and from the irregular rotation compensating device via the transverse driving device to the transmission input shaft.

11. The hybrid drive train according to claim 10, wherein the compensating device is a dual mass flywheel.

12. The hybrid drive train according to claim 10, further comprising:
at least one decoupling device which is designed to interrupt a transmission of torque from the internal combustion engine to the first drive axle when a predetermined torque threshold value is exceeded, wherein the decoupling device is arranged in the irregular rotation compensating device.

13. The hybrid drive train according to claim 1, further comprising:
at least one decoupling device which is designed to interrupt a transmission of torque from at least one of the first electrical machine or the second electrical machine to the first drive axle when a predetermined torque threshold value is exceeded, wherein the decoupling device is arranged in the transmission.

14. The hybrid drive train according to claim 13, wherein the decoupling device is a slip clutch.

15. The hybrid drive train according to claim 1, wherein the transmission input shaft is configured as a hollow shaft in which the first drive axle is guided.

16. The hybrid drive train according to claim 1, wherein the internal combustion engine is arranged axially behind the transmission in the direction of travel, and at least one electrical machine is arranged axially in front of the transmission in the direction of travel.

17. The hybrid drive train according to claim 1, wherein the internal combustion engine is arranged axially in front of or behind the transmission in the direction of travel, and
at least one electrical machine is arranged transversely next to the internal combustion engine in the direction of travel.

18. The hybrid drive train according to claim 1, wherein
the first electrical machine is designed to transmit the torque to the first drive axle drivable by the internal combustion engine, and
the internal combustion engine is arranged axially in front of the transmission in the direction of travel, and the first electrical machine is arranged axially behind the transmission in the direction of travel.

19. The hybrid drive train according to claim 1, wherein
the first electrical machine is designed to transmit the torque to the first drive axle drivable by the internal combustion engine, and the first electrical machine is arranged axially offset from the transmission in the direction of travel.

* * * * *